Figure 1:
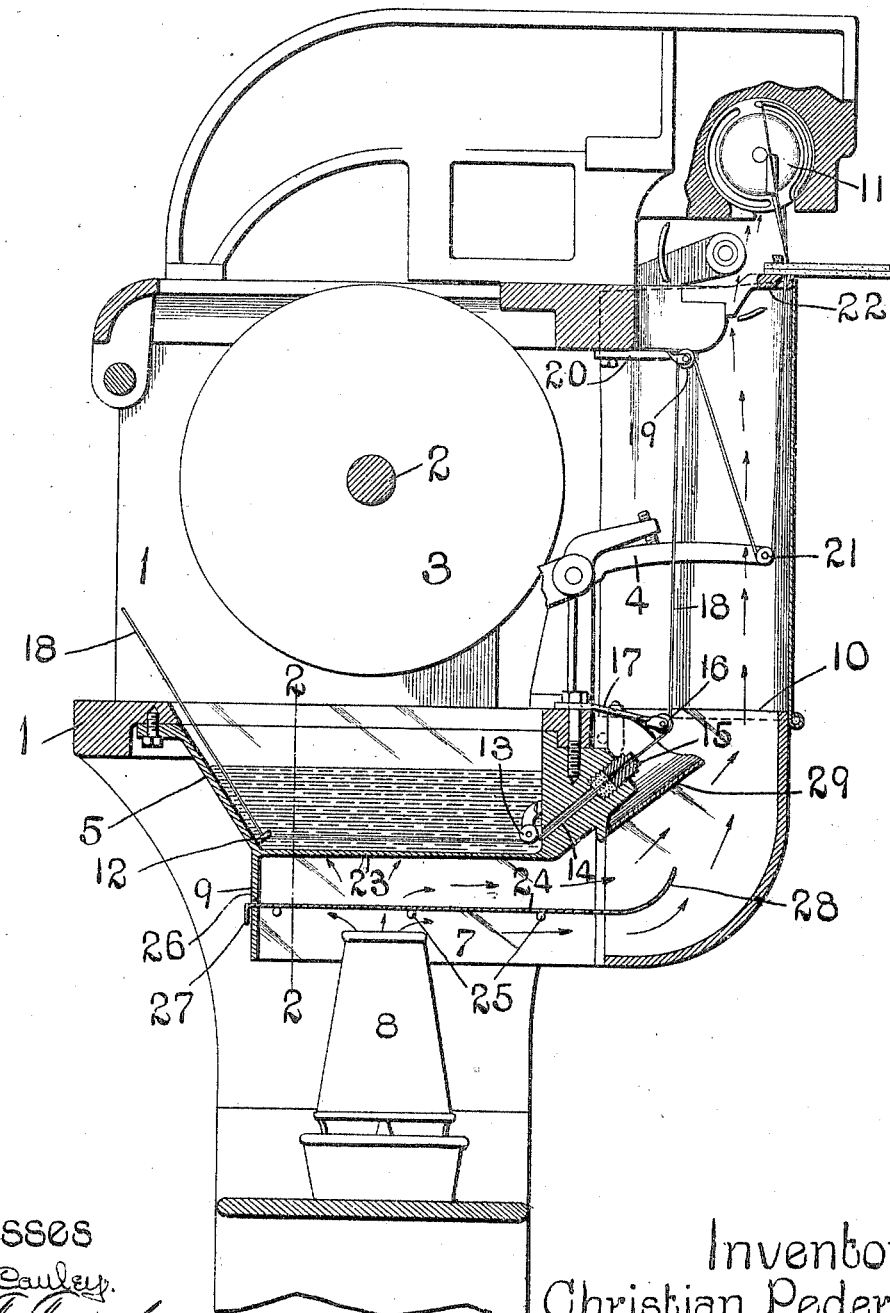

No. 811,581. PATENTED FEB. 6, 1906.
C. PEDERSEN.
HEATING DEVICE FOR SEWING MACHINES.
APPLICATION FILED AUG. 14, 1905.

2 SHEETS—SHEET 1.

Witnesses
A. J. McCauley
B. F. Funk

Inventor:-
Christian Pedersen
BY Bakewell Cornwall
ATTY'S.

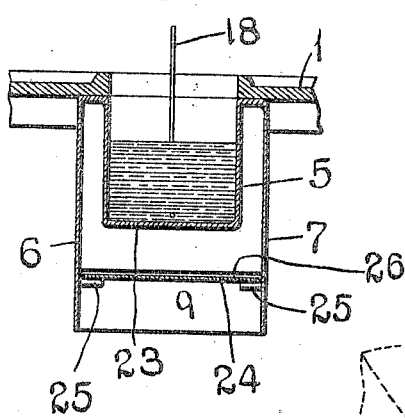
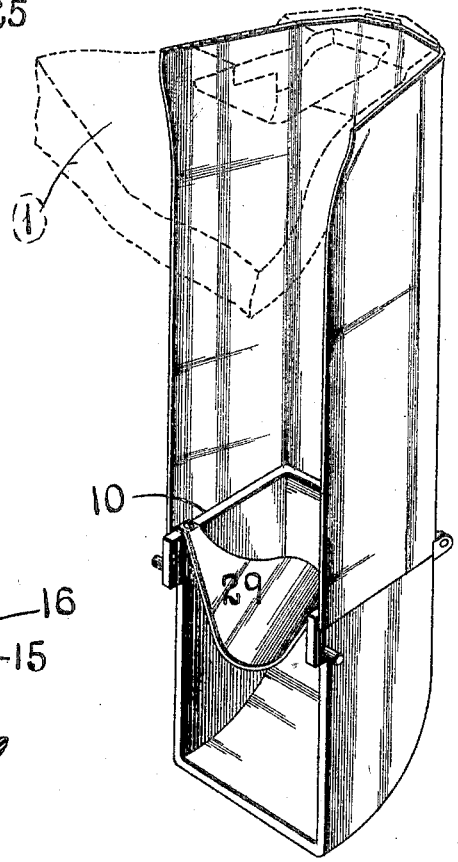
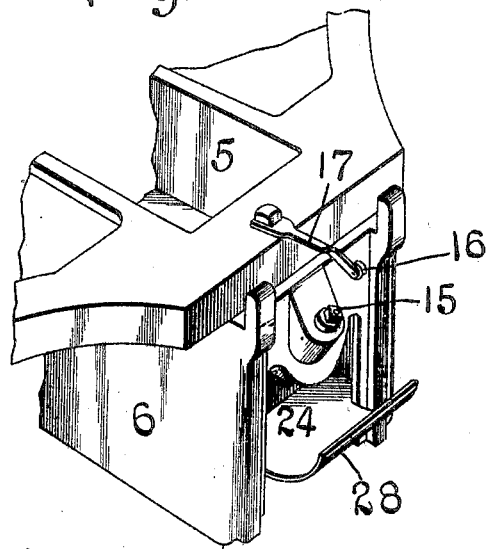

UNITED STATES PATENT OFFICE.

CHRISTIAN PEDERSEN, OF ST. LOUIS, MISSOURI, ASSIGNOR TO LANDIS MACHINE COMPANY, OF ST. LOUIS, MISSOURI, A CORPORATION OF MISSOURI.

HEATING DEVICE FOR SEWING-MACHINES.

No. 811,581.  Specification of Letters Patent.  Patented Feb. 6, 1906.

Application filed August 14, 1905. Serial No. 274,112.

*To all whom it may concern:*

Be it known that I, CHRISTIAN PEDERSEN, a citizen of the United States, residing at St. Louis, Missouri, have invented a certain new and useful Improvement in Heating Devices for Sewing-Machines, of which the following is a full, clear, and exact description, such as will enable others skilled in the art to which it appertains to make and use the same, reference being had to the accompanying drawings, forming part of this specification, in which—

Figure 1 is a sectional view through a machine constructed in accordance with my invention, showing the heating apparatus applied thereto. Fig. 2 is a cross-sectional view on the line 2 2 of Fig. 1. Fig. 3 is a detail perspective view of the vertical flue, and Fig. 4 is a detail perspective view of a portion of the wax-pot utilized in connection with my device.

This invention relates to a heating system for sewing-machines in which a wax-thread is employed; and one of the objects of the invention is to provide means for initially heating the wax in the wax-pot and also for deflecting the heat, so as to maintain the thread at a proper temperature before entering the leather.

It is also the purpose of my invention to generally improve upon this class of machines; and to this end my invention consists in certain novel parts and combinations of parts, all as will be specifically set forth in the following description, reference being had to the novel features in the appended claims.

In the drawings illustrating the preferred form of my invention, 1 indicates a frame in which is a shaft 2, having a cam 3 for operating appropriate mechanism for carrying on the several operations of the machine—as, for example, the take-up lever 4 of the thread-laying mechanism. Carried by the frame 1 is a wax-pot 5, which is provided with a housing comprising depending side walls 6 and 7 immediately above a suitable source of fuel-supply, indicated as a lamp 8. The housing inclosed by the side walls 6 and 7 and rear wall 9 is in communication with a vertical flue 10, which extends upwardly to a point adjacent the shuttle mechanism 11. The wax-pot is provided at its rear interior wall with a thread-guide 12 and at its forward walls with a thread-guide 13 adjacent to an opening 14 in the front wall of the wax-pot, said opening being in line with a nipple 15, through which the thread passes from the wax-pot and over a pulley 16 on the arm 17, secured to the frame. The thread, which is designated by the reference-numeral 18, then passes up around the pulley 19 on the arm 20, carried by the frame, thence downwardly around a pulley 21 on the arm 4, thence adjacent the work-table 22, to be engaged by the needle. Below the bottom wall 23 of the wax-pot is a slide-damper 24, which is supported on lugs or projections 25 in the side walls 6 and 7 of the housing, which lugs or projections constitute guides and supports for said damper, the damper projecting through an opening 26 in the rear wall of the housing and being provided with an engaging portion 27, whereby the operator may slide the damper rearwardly when the machine is to be first started up. In starting up the machine the operator will grasp the portion 27 to withdraw the slide partially, so that the heat from the source of heat-supply 8 will be directed onto the bottom of the wax-pot until the desired temperature is reached. The slide will then be moved back to the position indicated in Fig. 1, so that the direct heat will be deflected, as indicated by the arrows, up through the flue 10, maintaining all of the thread at the proper temperature between the wax-pot and the work. The slide-damper 24 is provided with the upwardly-curved end portion 28, and the flue 10 carries a baffle or deflector 29, so that the heat will be directed upwardly in whichever position the damper 24 is placed.

From the foregoing it will be observed that notwithstanding the fact that the damper 24 may be in a position (shown in Fig. 1) so as to prevent the heat coming in direct contact with the wax-pot the wax will be maintained at the proper temperature, because a sufficient amount of heat will radiate from the damper to the wax-pot after it has been initially heated, and the heat radiating up through the flue 10 will be sufficient to prevent the wax becoming hardened on the thread. The heat will not only be deflected, so as to keep the thread warm during the operation of the machine, but the shuttle will be sufficiently heated, so as to prevent hardening of the waxed thread during the operation of sewing. The deflector 29 is also utilized to prevent burning of the thread by the heat in the flue.

Having thus described the invention, what is claimed as new, and desired to be secured by Letters Patent, is—

1. In a sewing-machine, the combination with a wax-pot and a flue below the same and extending upwardly to the shuttle, of a burner in the flue below the wax-pot, and a sliding cut-off having a curved end extending upwardly in the flue, said cut-off being interposed between the burner and the wax-pot; substantially as described.

2. In a sewing-machine, the combination with a wax-pot having a nipple in one of its walls provided with an opening communicating with an opening through the wall of the wax-pot, an L-shaped flue having its horizontal portion below the wax-pot and its vertical portion extending above the same and terminating adjacent the shuttle, a burner in the horizontal portion of the flue, a deflector-slide interposed between the burner and the wax-pot, and a thread-guard adjacent to the nipple and projecting into the flue for deflecting the heat to prevent burning of the thread by the heat which may pass up the vertical portion of the flue; substantially as described.

3. In a sewing-machine, the combination with a wax-pot having a thread-opening in one wall thereof, a heat-deflector adjacent to the opening in the wall of the wax-pot and extending outwardly therefrom, a flue surrounding the opening and heat-deflector and having a horizontal portion below the wax-pot, a burner below the wax-pot, and means for cutting off the heat from the bottom of the wax-pot, said means being interposed between the burner and the wax-pot; substantially as described.

In testimony whereof I hereunto affix my signature, in the presence of two witnesses, this 11th day of August, 1905.

CHRISTIAN PEDERSEN.

Witnesses:
 B. F. FUNK,
 GEORGE BAKEWELL.